United States Patent
Naim et al.

(10) Patent No.: US 8,909,240 B1
(45) Date of Patent: Dec. 9, 2014

(54) SYSTEMS AND METHODS FOR MANAGING CALL ADMISSION

(71) Applicant: Sprint Spectrum LP, Overland Park, KS (US)

(72) Inventors: Muhammad Naim, Sterling, VA (US); Chunmei Liu, Great Falls, VA (US); Aik Chindapol, Washington, DC (US); Yu Zhou, Herdon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 27 days.

(21) Appl. No.: 13/801,751

(22) Filed: Mar. 13, 2013

(51) Int. Cl.
*H04W 72/10* (2009.01)

(52) U.S. Cl.
CPC .................... *H04W 72/10* (2013.01)
USPC ........ 455/452.1; 455/450; 455/453; 455/509; 455/512; 370/329; 370/341

(58) Field of Classification Search
CPC ...... H04W 72/10; H04W 72/08; H04W 72/04
USPC ............. 455/450, 452.1, 509, 512, 453; 370/329, 341
See application file for complete search history.

(56) References Cited

U.S. PATENT DOCUMENTS

| | | | |
|---|---|---|---|
| 8,159,953 B2* | 4/2012 | Kahn et al. ................ | 370/235 |
| 8,755,831 B2* | 6/2014 | Brewer et al. ............. | 455/518 |
| 2007/0129079 A1* | 6/2007 | Schwarz et al. ........... | 455/450 |
| 2013/0051332 A1* | 2/2013 | Sridhar ..................... | 370/329 |
| 2013/0130693 A1* | 5/2013 | Salvador et al. ........... | 455/437 |
| 2013/0272219 A1* | 10/2013 | Singh et al. ................ | 370/329 |
| 2013/0310056 A1* | 11/2013 | Cabrera ..................... | 455/450 |

* cited by examiner

*Primary Examiner* — Kamran Afshar
*Assistant Examiner* — Farideh Madani

(57) ABSTRACT

In systems and methods for managing call admission, a channel request comprising a first service level priority is received from a first wireless device at an access node. Channels of the access node associated with a second service level priority greater than or equal to the first service level priority are selected. A loading of the selected channels is determined, and the loading of the selected channels is compared to a loading criteria. When the determined loading meets the loading criteria, a preemption attempt is performed of a channel associated with a third service level priority less than the first service level priority.

18 Claims, 5 Drawing Sheets

SYSTEMS AND METHODS FOR MANAGING CALL ADMISSION

TECHNICAL BACKGROUND

A wireless device attempting to initiate communication with an access node typically sends a request for a channel to the access node. When a request for a channel is received, existing network resources, and in particular resources of the access node receiving the channel request, are evaluated to determine whether communication with the wireless device can be supported at the access node. When the access node has the capacity and the communications capability to provide communications to the requesting wireless device, the wireless device is admitted to the access node.

Overview

In operation, a channel request comprising a first service level priority is received from a first wireless device at an access node. Channels of the access node associated with a second service level priority greater than or equal to the first service level priority are selected. A loading of the selected channels is determined, and the loading of the selected channels is compared to a loading criteria. When the determined loading meets the loading criteria, a preemption attempt is performed of a channel associated with a third service level priority less than the first service level priority

DETAILED DESCRIPTION

Figure 1:
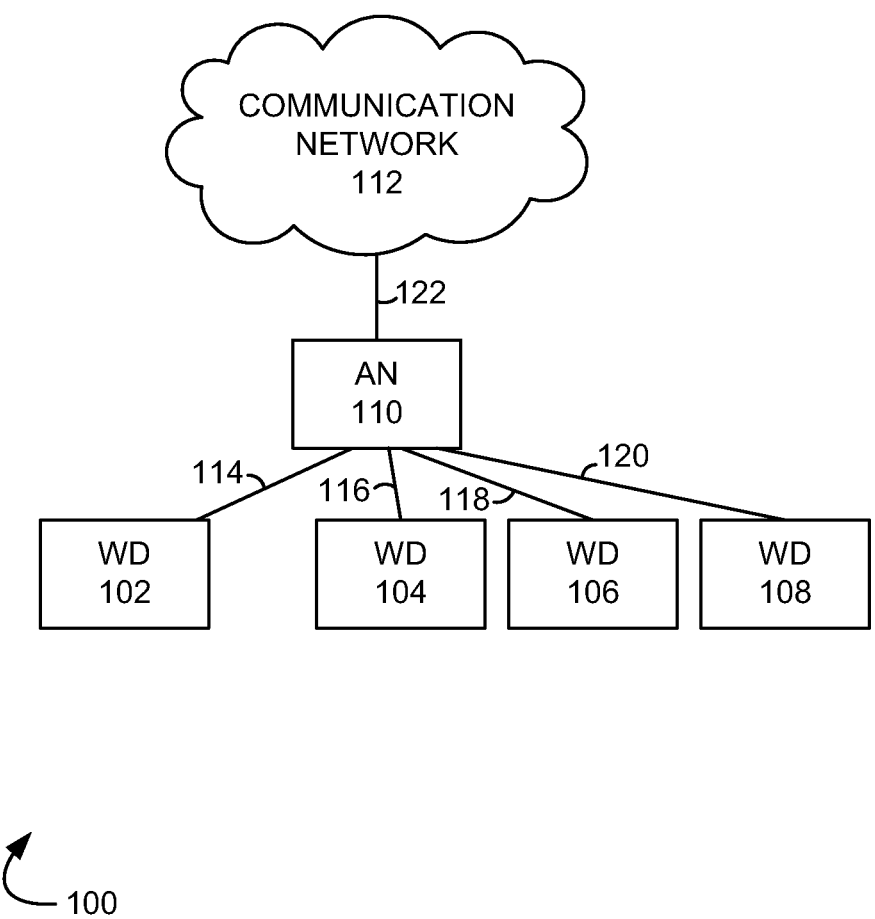
FIG. 1 illustrates an exemplary communication system to manage call admission.

FIG. 1 illustrates an exemplary communication system 100 to manage call admission comprising wireless devices 102, 104, 106 and 108, access node 110, and communication network 112. Examples of wireless devices 102, 104, 106 and 108 can comprise a cell phone, a smart phone, a computing platform such as a laptop, palmtop, or tablet, a personal digital assistant, or an internet access device, including combinations thereof. Wireless devices 102, 104, 106 and 108 are in communication with access node 110 over communication links 114, 116, 118 and 120, respectively.

Access node 110 is a network node capable of providing wireless communications to wireless devices 102, 104, 106 and 108, and can be, for example, a base transceiver station, a radio base station, an eNodeB device, or an enhanced eNodeB device. Access node 110 is in communication with communication network 112 over communication link 122.

Communication network 112 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 112 can be capable of carrying voice information, for example, to support voice communications by a wireless device such as wireless devices 102, 104, 106 and 108. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 112 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 112 may also comprise base stations, controller nodes, telephony switches, internet routers, network gateways, computer systems, communication links, or some other type of communication equipment, and combinations thereof.

Communication links 114, 116, 118, 120 and 122 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 110 and communication network 112 which are omitted for clarity, including additional processing nodes, routers, gateways, and physical and/or wireless data links for carrying data among the various network elements.

A wireless device attempting to initiate a communication session typically sends a request to an access node for a channel. The channel request can be sent by a separate channel from channel information (for example, out of band signaling). When a request for a channel is received at an access node, it can be evaluated whether the channel is subject to determination, for example, as part of a call admission control determination or some other functionally similar determination. For example, existing network resources, and in particular resources of the access node receiving the channel request, are evaluated to determine whether communication with the wireless device can be supported at the access node. Examples of existing network resources include the number of wireless devices in communication with an access node, the number and type of channels currently provided by the access node, a processor usage level, a physical resource block usage level, a backhaul utilization level, and the like. The availability of network resources to support the communications associated with an incoming channel request can comprise an access node capacity.

In addition, when a channel request is received, and when the demand on existing network resources meets a threshold, a preemption attempt can be made. A request for a channel is typically associated with a service level priority for allocation of network resources. When a channel request is received, the service level priority associated with the channel request can be considered, and if another wireless device can be identified which has a lower service level priority than the incoming channel request, and which is currently in communication with the access node, the wireless device with the lower service level priority may be preempted in favor of the received channel request having a higher service priority.

For example, a channel request can be received by access node 110 from wireless device 102, where access node 110 is already supporting communications with wireless devices 104, 106 and 108. A service level priority associated with the channel request from wireless device 102 can be considered and compared with a service level priority associated with each of wireless devices 104, 106 and 108. Where a wireless device with a lower service level priority is found, the wireless device with the lower service level priority may be preempted in favor of the received channel request associated with a higher service level priority. Where a wireless device with a lower service level priority is not found, the channel request from wireless device 102 can be rejected. Further, the resources that were used to attempt to identify a currently-served wireless device with a lower service level priority are wasted. This can cause excessive processing and signaling load, and can also lead to additional delay in establishing a channel for the wireless device which sent the channel request.

In an embodiment, access node 110 can comprise an element which can perform a call admission control determination or some other functionally similar determination. For example, access node 110 can comprises a call admission control entity to determined the admission of incoming channel requests.

In operation, a channel request comprising a first service level priority is received from wireless device 102 at access node 110. Channels associated with a second service level priority greater than or equal to the first service level priority are selected, and a loading of the selected channels is determined. The loading of the selected channels is compared to a loading criteria. When the loading meets the loading criteria, a preemption attempt is performed of a channel associated with a third service level priority less than the first service level priority.

Figure 2:
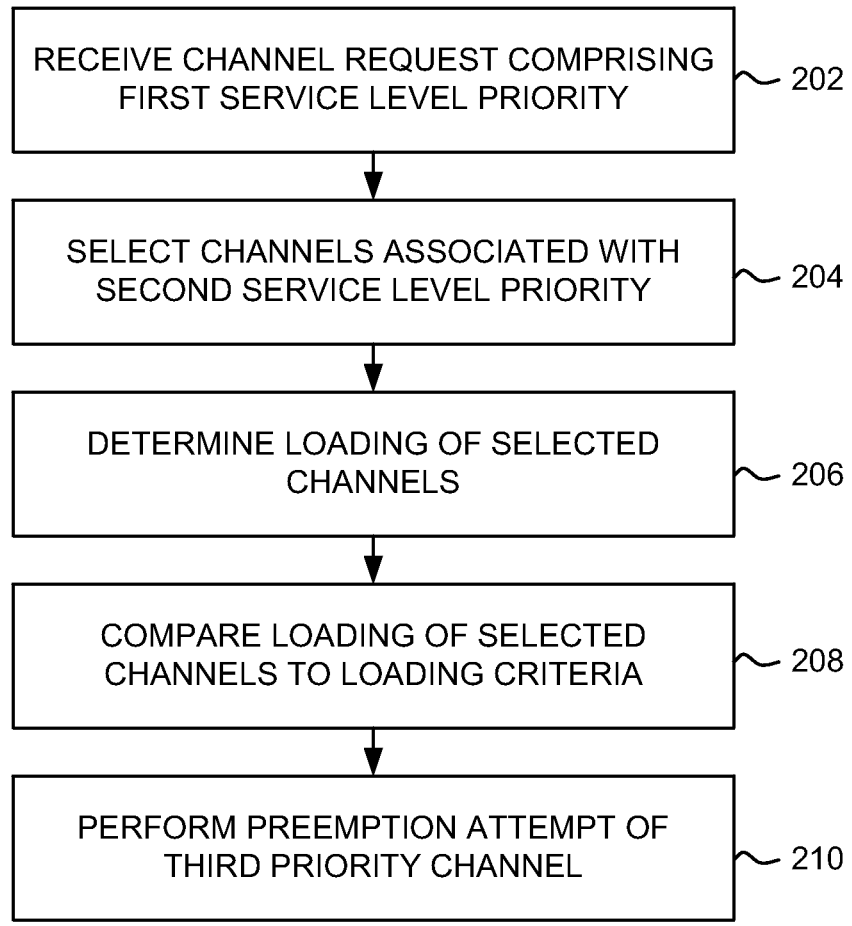
FIG. 2 illustrates an exemplary method of managing call admission.

FIG. 2 illustrates an exemplary method of managing call admission. In operation 202, a channel request comprising a first service level priority is received. For example, a channel request can be received from wireless device 102 at access node 110. The channel request from wireless device 102 can comprise a first service level priority.

In operation 204, channels associated with a second service level priority greater than or equal to the first service level priority are selected. For example, service level priorities of channels used by wireless devices 104, 106 and 108 can be evaluated.

Figure 3A:
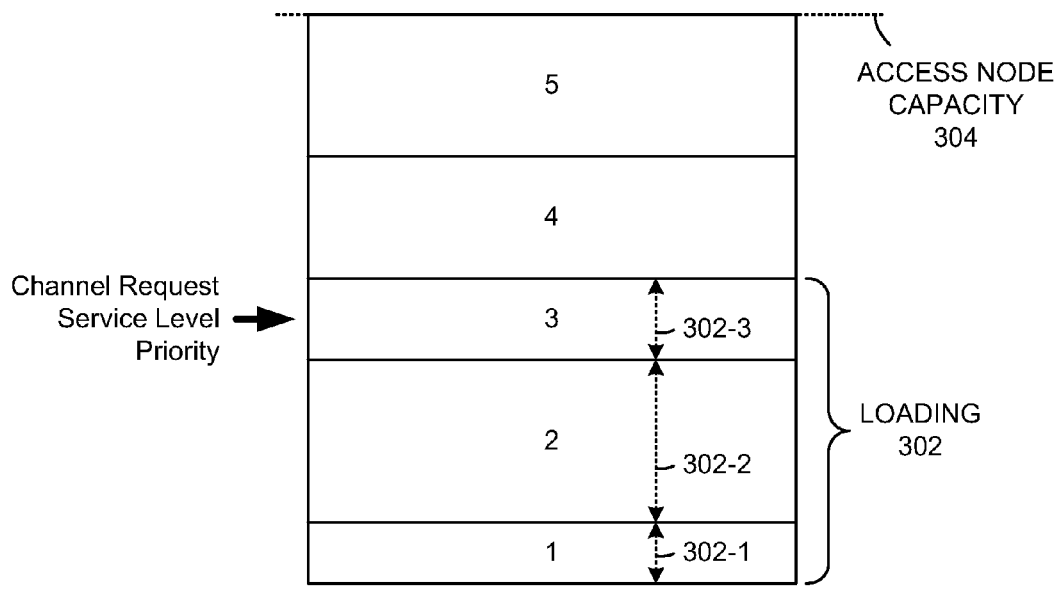
FIGS. 3A and 3B illustrate exemplary access node capacities and service level priorities of channels.
Figure 3B:
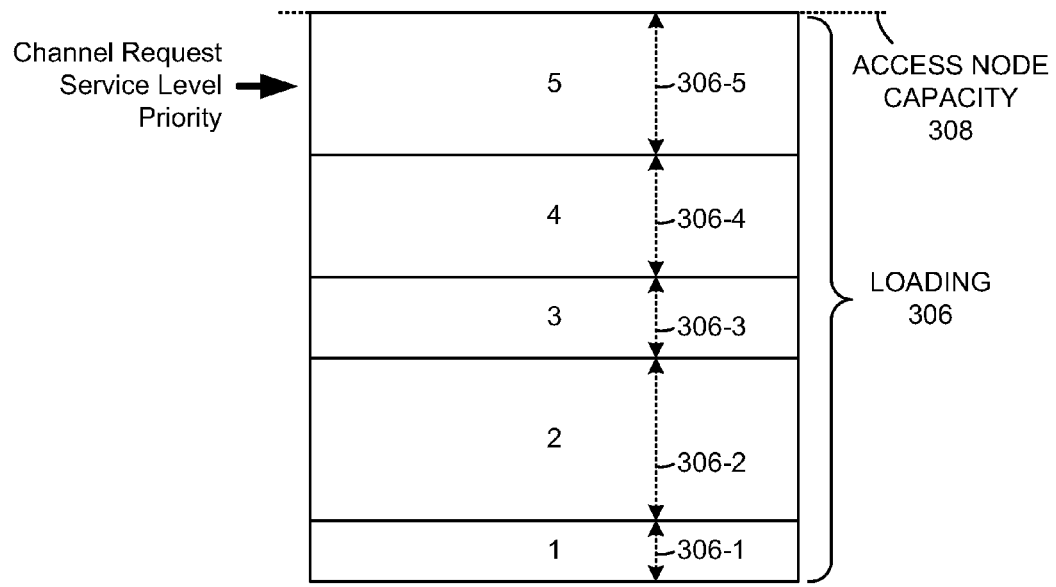

FIGS. 3A and 3B each illustrate a representation of a loading of channels supported by access node 110 at the time a channel request is received. A loading of channels associated with five levels of service level priority 1-5 are illustrated in FIGS. 3A and 3B, where 1 is the highest service level priority and 5 is the lowest service level priority. While five levels of service level priority 1-5 are illustrated in FIGS. 3A and 3B, this is merely exemplary; greater or fewer service priority levels can be used, and other indicators of their relative priority can also be employed. As an example of operations 202 and 204, referring to FIG. 3A, when a channel request from wireless device 102 comprises a service level priority of 3, channels of wireless devices 104, 106 and 108 can be selected which are associated with a service level priority of 3 or greater (i.e., service levels 3, 2, and 1). As another example of operations 202 and 204, referring to FIG. 3B, when a channel request from wireless device 102 comprises a service level priority of 5, channels of wireless devices 104, 106 and 108 can be selected which are associated with a service level priority of 5 or greater (i.e., service levels 5, 4, 3, 2, and 1).

A service level priority can be based on a variety of factors. For example, a service level priority can be based on an allocation priority associated with a quality of service parameter, such as an allocation and retention priority value. In an embodiment, an allocation priority can be associated with a wireless device, for example, according to information from communication network 112. The information can be provided by a network element such as a home subscriber server (HSS), a home location register (HLR), or another network element of communication network 112. A service level priority can also be based on a priority associated with an application running on a wireless device, or a priority related to a requested service, such as a quality class indicator, or a service flow class indicator, or other similar indicator. A service level priority can also be based on a guaranteed data rate, or a guaranteed bandwidth, which may be required for a wireless device. A service level priority can also be based on an application requirement of an application running on a wireless device, such as a required minimum data rate, a maximum permitted delay, a maximum permitted error rate, or some other application requirement. As another example, a service level priority can be determined for a wireless device when the wireless device is provisioned in a communication network. As an example, a wireless device can be associated with a high priority (such as a service level priority of 1) when the wireless device is intended for use by emergency response or public safety personnel. A service level priority can also be based on combinations of any of the foregoing.

Returning to FIG. 2, in operation 206, a loading is determined of the selected channels. For example, in FIG. 3A, when a channel request service level priority is 3, loading 302 is determined of the selected channels having a service level priority of 3 or higher. Loading 302 comprises loading 302-1 of channels associated with service level priority 1, loading 302-2 of channels associated with service level priority 2, and loading 303-3 of channels associated with service level priority 3. As another example, when a channel request service level priority is 5, as illustrated in FIG. 3B, loading 306 is determined of the selected channels having a service level priority of 5 or higher. Loading 306 comprises loading 306-1 of channels associated with service level priority 1, loading 306-2 of channels associated with service level priority 2, loading 306-3 of channels associated with service level priority 3, loading 306-4 of channels associated with service level priority 4, and loading 303-5 of channels associated with service level priority 5. The determined loading may not reflect the entire loading of the access node. For example, loading 302, based on selected channels associated with a service level priority 3 or higher, does not reflect the entire access node capacity 304. However, loading 306, based on selected channels associated with a service level priority 5 or higher, substantially reflects the access node capacity 308. A loading may be determined, for example, based on a physical resource block usage, a processor utilization, a backhaul utilization, a maximum number of permitted connections, and the like.

Referring again to FIG. 2, in operation 208, the determined loading is compared to a loading criteria. For example, in FIG. 3A, loading 302 is determined based on loadings 302-1, 302-2, and 302-3. Loading 302 can be compared, for example, to access node capacity 304. As another example, in FIG. 3B, loading 306 can be compared to access node capacity 308.

Returning to FIG. 2, in operation 210, a preemption attempt is performed of a channel associated with a third service level priority less than the first service level priority when the loading meets the loading criteria. For example, referring to FIG. 3A, a preemption attempt can be performed of a wireless device associated with a service level priority of 4 or 5. When a preemption attempt is performed, communications of a wireless device of the third priority can be dropped or suspended and a channel can be re-assigned to the wireless device from which the channel request was received.

Figure 4:
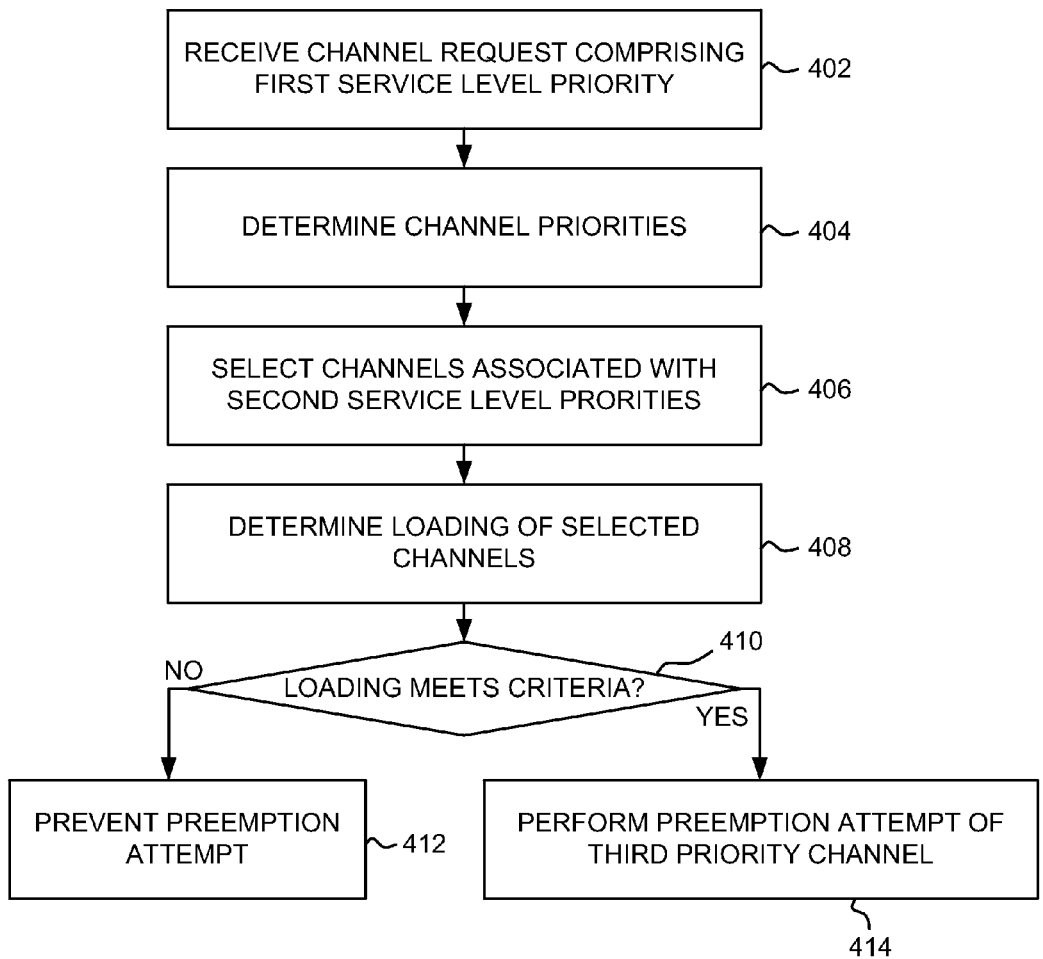
FIG. 4 illustrates another exemplary method of managing call admission.

FIG. 4 illustrates another exemplary method of managing call admission. In operation 402, a channel request comprising a first service level priority is received. For example, a channel request can be received from wireless device 102 at access node 110. The channel request from wireless device 102 can comprise a first service level priority. In operation 404, service level priorities associated with existing channel are determined. For example, when a channel request is received from wireless device 102 comprising a first service level priority, the service level priorities of existing channels associated with wireless devices 104, 106 and 108 can be determined.

In operation 406, channels associated with a second service level priority greater than or equal to the first service level priority are selected. For example, based on the determined channel service level priorities associated with wireless devices 104, 106 and 108, at least one of the channels associated with wireless device 104, 106 and 108 can be selected. The comparative channel service level priorities associated with wireless devices 104, 106 and 108 may lead to none of the wireless devices being selected, such as where for example, none of wireless devices 104, 106 or 108 are associated with a second service level priority greater than or equal to the first service level priority.

In operation 408, a loading is determined of the selected channels. As illustrated in FIG. 3A, when a channel request service level priority is 3, loading 302 is determined of the selected channels having a service level priority of 3 or higher. For example, loading 302 comprises loading 302-1 of channels associated with service level priority 1, loading 302-2 of channels associated with service level priority 2, and loading 303-3 of channels associated with service level priority 3. As another example, when a channel request service level priority is 5, as illustrated in FIG. 3B, loading 306 is determined of the selected channels having a service level priority of 5 or higher. Loading 306 comprises loading 306-1 of channels associated with service level priority 1, loading 306-2 of channels associated with service level priority 2, loading 306-3 of channels associated with service level priority 3, loading 306-4 of channels associated with service level priority 4, and loading 303-5 of channels associated with service level priority 5. The determined loading may not reflect the entire loading of the access node. For example, loading 302, based on selected channels associated with a service level priority 3 or higher, does not reflect the entire access node capacity 304. However, loading 306, based on selected channels associated with a service level priority 5 or higher, does reflect the access node capacity 308.

A loading may be determined, for example, based on a physical resource block usage, a processor utilization, a backhaul utilization, a maximum number of permitted connections, and the like. In an embodiment, a loading can comprise an average physical resource block usage. In an embodiment, a loading can comprise an average usage of a backhaul of the access node. In an embodiment, a loading can comprise a processor utilization of the access node.

In operation 410 (FIG. 4), it can be determined whether the loading meets a loading criteria. For example, in FIG. 3A, loading 302 can be determined based on loadings 302-1, 302-2, and 302-3. Loading 302 can be compared, for example, to access node capacity 304. As another example, in FIG. 3B, loading 306 can be compared to access node capacity 308. When the determined loading does not meet the loading criteria (operation 410—NO), then a preemption attempt is prevented (operation 412). For example, referring to FIG. 3B, a received channel request can be associated with a service level priority of 5. Determined loading 306 reflects loadings 306-1, 306-2, 306-3, 306-4, and 306-5, and indicates that the access node is substantially at maximum capacity. Further, no channels are present in FIG. 3B which are associated with a lower service level priority than that associated with the channel request. In other words, an attempted preemption of a current channel of the access node would most likely be unsuccessful. In such case, the access node can be instructed to prevent a preemption attempt. For example, when a channel request is received from wireless device 102 at access node 110, and the channel request is associated with a service level priority of 5, in the scenario illustrated in FIG. 3B, access node 10 can be instructed to prevent a preemption attempt on behalf of wireless device 102. In an embodiment, access node 110 can generate the instruction. In an embodiment, the instruction can be generated by another element of communication system 100 and provided to access node 110. In an embodiment, an indication that a preemption event is prevented can be provided to wireless device 102.

Referring again to FIG. 4, when the loading meets the loading criteria (operation 410—YES), a preemption attempt is performed of a channel associated with a third service level priority less than the first service level priority when the loading meets the loading criteria (operation 414). For example, referring to FIG. 3A, a preemption attempt can be performed of a wireless device associated with a service level priority of 4 or 5. When a preemption attempt is performed, communications of a wireless device of the third priority can be dropped or suspended and a channel can be re-assigned to the wireless device from which the channel request was received.

The determination of an access node loading based on a service level priority associated with a channel request can reduce signaling overhead associated with attempts to preempt a channel which will likely be unsuccessful. In addition, the determination of an access node loading based on a service level priority associated with a channel request can also produce faster assignment and set up of channels for channel requests with sufficiently high service level priority that a channel preemption attempts will likely succeed.

Figure 5:
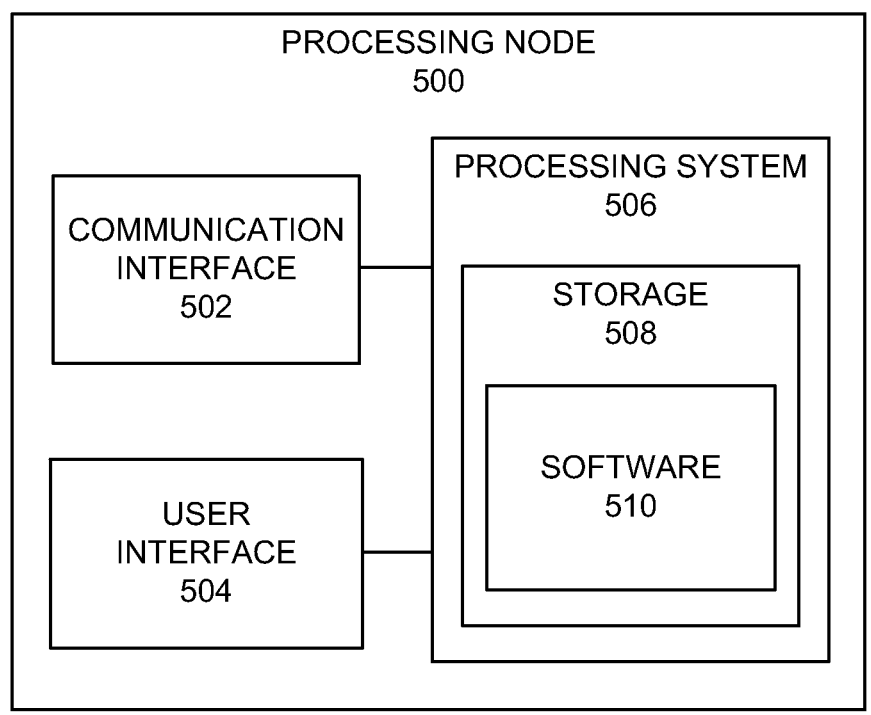
FIG. 5 illustrates an exemplary processing node.

FIG. 5 illustrates an exemplary processing node 500 comprising communication interface 502, user interface 504, and processing system 506 in communication with communication interface 502 and user interface 504. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access node 110. Processing node 500 can also be an adjunct or component of a network element, such as an element of access node 110. Processing node 500 can also be another network element in a communication system. Further, the functionality of processing node 500 can be distributed over two or more network elements of communication system 100.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing call admission, comprising:
receiving, from a first wireless device at an access node, a channel request comprising a first service level priority;
selecting, based on the received channel request, channels associated with a first group of wireless devices that are connected to the access node and that each have a second service level priority greater than or equal to the first service level priority;
determining that a loading of the selected channels has met a loading criteria; and
detecting a channel associated with at least one wireless device of a second group of wireless devices that are connected to the access node and that each have a third service level priority and performing a preemption attempt of the detected channel when the third service level priority is less than the first service level priority, and
wherein the received channel request is rejected when the channel associated with the third service level priority is not detected.

2. The method of claim 1, further comprising:
preventing the preemption attempt of the channel associated with the third service level priority when the loading does not meet the loading criteria.

3. The method of claim 1, wherein the loading of the selected channels further comprises an average physical resource block usage.

4. The method of claim 1, wherein the loading of the selected channels further comprises an average usage of a backhaul of the access node.

5. The method of claim 1, wherein the loading of the selected channels further comprises a processor utilization of the access node.

6. The method of claim 1, wherein the first service level priority, the second service level priority, and the third service level priority comprise an allocation and retention priority value.

7. The method of claim 1, wherein the first service level priority, the second service level priority, and the third service level priority comprise a service quality level.

8. The method of claim 7, wherein the service quality level further comprises at least one of a guaranteed data rate and a guaranteed bandwidth.

9. The method of claim 1, wherein the first service level priority, the second service level priority, and the third service level priority comprise an application requirement of an application running on a wireless device.

10. A system for managing call admission, comprising:
a processing node configured to
receive, from a first wireless device at an access node, a channel request comprising a first service level priority;
select, based on the received channel request, channels associated with a first group of wireless devices that are connected to the access node and that each have a second service level priority greater than or equal to the first service level priority;
determine that a loading of the selected channels has met a loading criteria; and
detect a channel associated with at least one wireless device of a second group of wireless devices that are connected to the access node and that each have a third service level priority and perform a preemption attempt of the detected channel when the third service level priority is less than the first service level priority, and
wherein the received channel request is rejected when the channel associated with the third service level priority is not detected.

11. The system of claim 10, wherein the processing node is further configured to
prevent the preemption attempt of the channel associated with the third service level priority when the loading does not meet the loading criteria.

12. The system of claim 10, wherein the loading of the selected channels further comprises an average physical resource block usage.

13. The system of claim 10, wherein the loading of the selected channels further comprises an average usage of a backhaul of the access node.

14. The system of claim 10, wherein the loading of the selected channels further comprises a processor utilization of the access node.

15. The system of claim 10, wherein the first service level priority, the second service level priority, and the third service level priority comprise an allocation and retention priority value.

16. The system of claim 10, wherein the first service level priority, the second service level priority, and the third service level priority comprise a service quality level.

17. The system of claim 16, wherein the service quality level further comprises at least one of a guaranteed data rate and a guaranteed bandwidth.

18. The system of claim 10, the first service level priority, the second service level priority, and the third service level priority comprise an application requirement of an application running on a wireless device.

* * * * *